United States Patent
Kneib et al.

(10) Patent No.: US 12,206,681 B2
(45) Date of Patent: Jan. 21, 2025

(54) METHOD FOR CHECKING A MESSAGE IN A COMMUNICATION SYSTEM

(71) Applicant: Robert Bosch GmbH, Stuttgart (DE)

(72) Inventors: Marcel Kneib, Ingelheim (DE); Oleg Schell, Krautheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 350 days.

(21) Appl. No.: 17/453,531

(22) Filed: Nov. 4, 2021

(65) Prior Publication Data
US 2022/0174073 A1 Jun. 2, 2022

(30) Foreign Application Priority Data

Nov. 27, 2020 (DE) .................. 10 2020 214 945.3

(51) Int. Cl.
*H04L 9/40* (2022.01)
*G06F 21/55* (2013.01)
*H04L 12/40* (2006.01)

(52) U.S. Cl.
CPC .......... *H04L 63/126* (2013.01); *G06F 21/55* (2013.01); *H04L 12/40* (2013.01); *H04L 63/1408* (2013.01); *H04L 63/1416* (2013.01); *H04L 63/1425* (2013.01); *H04L 2012/40215* (2013.01)

(58) Field of Classification Search
CPC .............. H04L 63/126; H04L 63/1408; H04L 63/1416; H04L 63/1425; H04L 63/1441; H04L 12/40; H04L 12/40039; H04L 2012/40215; H04L 2012/40273; G06F 21/55
See application file for complete search history.

(56) References Cited

U.S. PATENT DOCUMENTS

| | | | | |
|---|---|---|---|---|
| 5,999,807 A | * | 12/1999 | Kaplan | H04M 1/67 |
| | | | | 379/189 |
| 7,162,262 B2 | * | 1/2007 | Jonsson | H04W 52/12 |
| | | | | 455/226.1 |
| 8,730,612 B1 | * | 5/2014 | Haralson | G11B 5/607 |
| | | | | 360/75 |

(Continued)

FOREIGN PATENT DOCUMENTS

| | | | | |
|---|---|---|---|---|
| CN | 111787013 B | * | 2/2022 | H04J 3/0658 |
| FR | 3102270 A1 | * | 4/2021 | G06F 21/55 |

(Continued)

OTHER PUBLICATIONS

Yajima, Jun et al. JP 2018088616 A (Machine translation), published Jun. 7, 2018. (Year: 2018).*

(Continued)

*Primary Examiner* — Michael Simitoski
(74) *Attorney, Agent, or Firm* — NORTON ROSE FULBRIGHT US LLP; Gerard A. Messina

(57) ABSTRACT

A method for checking a message in a communication system, in which multiple users are connected to a communication medium and exchange messages via same. A time difference between points in time of reception of a message that is sent on the communication medium is ascertained at two different, predefined positions on the communication medium, and based on a comparison of the time to at least one reference time difference, it is determined whether the message originates from a verified user.

9 Claims, 3 Drawing Sheets

(56) References Cited

U.S. PATENT DOCUMENTS

| | | | | |
|---|---|---|---|---|
| 8,903,593 | B1* | 12/2014 | Addepalli | H04L 43/0858 |
| | | | | 701/30.6 |
| 9,225,544 | B2* | 12/2015 | Mabuchi | H04L 12/4035 |
| 10,126,342 | B2* | 11/2018 | Moore | G05F 1/00 |
| 11,200,529 | B2* | 12/2021 | Sekine | G06Q 10/06398 |
| 11,386,201 | B2* | 7/2022 | Oberman | G06F 21/50 |
| 2002/0174347 | A1* | 11/2002 | Ting | G06F 21/57 |
| | | | | 713/186 |
| 2008/0155657 | A1* | 6/2008 | Ogura | H04L 63/08 |
| | | | | 726/3 |
| 2008/0161035 | A1* | 7/2008 | Tomioka | H04W 16/14 |
| | | | | 455/550.1 |
| 2009/0082829 | A1* | 3/2009 | Panken | A61N 1/36139 |
| | | | | 607/45 |
| 2010/0127079 | A1* | 5/2010 | Fang | G06K 19/12 |
| | | | | 235/449 |
| 2014/0007676 | A1* | 1/2014 | Armstrong | G01F 23/266 |
| | | | | 73/304 C |
| 2016/0066157 | A1* | 3/2016 | Noorshams | H04W 4/80 |
| | | | | 455/457 |
| 2016/0094392 | A1* | 3/2016 | Gabrielson | H04L 41/147 |
| | | | | 709/221 |
| 2018/0012090 | A1* | 1/2018 | Herbst | G06V 40/20 |
| 2018/0211176 | A1* | 7/2018 | Khurshudov | H04L 67/12 |
| 2018/0262526 | A1* | 9/2018 | Jain | H04L 63/1475 |
| 2018/0337938 | A1* | 11/2018 | Kneib | H04L 63/0876 |
| 2019/0238579 | A1* | 8/2019 | St?hlin | H04L 63/1425 |
| 2019/0245872 | A1* | 8/2019 | Shin | H04L 12/40 |
| 2019/0297401 | A1* | 9/2019 | Kim | G06N 3/08 |
| 2019/0319987 | A1* | 10/2019 | Levy | G06N 20/00 |
| 2019/0385057 | A1* | 12/2019 | Litichever | H04L 63/14 |
| 2020/0125725 | A1* | 4/2020 | Petersen | H04L 43/065 |
| 2020/0186560 | A1* | 6/2020 | Ben-Noon | H04L 63/123 |
| 2020/0202154 | A1* | 6/2020 | Wang | G06V 20/52 |
| 2020/0250403 | A1* | 8/2020 | Xiao | G06V 40/168 |
| 2020/0403825 | A1* | 12/2020 | Biham | H04L 43/16 |
| 2021/0067971 | A1* | 3/2021 | Kim | H04L 12/40019 |
| 2021/0144026 | A1* | 5/2021 | Stein | G06F 21/554 |
| 2021/0226977 | A1* | 7/2021 | Moriya | H04L 63/20 |
| 2021/0243038 | A1* | 8/2021 | Wilson | H04L 9/3247 |
| 2021/0264026 | A1* | 8/2021 | Amano | H04L 63/1408 |
| 2021/0360008 | A1* | 11/2021 | Moriya | H04L 12/40 |
| 2022/0030014 | A1* | 1/2022 | Potluri | H04L 63/1491 |
| 2022/0043768 | A1* | 2/2022 | Kneib | G06F 21/85 |
| 2022/0182404 | A1* | 6/2022 | Kishikawa | H04L 63/1416 |
| 2022/0311781 | A1* | 9/2022 | Maeda | H04L 63/1425 |
| 2023/0010743 | A1* | 1/2023 | Kieslinger | B60R 16/02 |

FOREIGN PATENT DOCUMENTS

| | | | | |
|---|---|---|---|---|
| JP | 2018088616 | A | * 6/2018 | H04L 12/40006 |
| JP | 2018523390 | A | * 8/2018 | |
| JP | 2020088798 | A | * 6/2020 | |
| WO | WO-2018186053 | A1 | * 10/2018 | B60R 16/023 |

OTHER PUBLICATIONS

Yang, Li et al. CN 111787013 B (Machine translation), published Feb. 25, 2022. (Year: 2022).*

Tomokazu, Moriya et al. JP 2020088798 A (Machine translation), published Jun. 4, 2020. (Year: 2020).*

Hammond, James et al. JP 2018523390 A (Machine translation), published Aug. 16, 2018. (Year: 2018).*

Harrar, Ahmed. FR 3102270 A1 (Machine translation), published Apr. 23, 2021. (Year: 2021).*

Choi, Wonsuk, et al. "Identifying ecus using inimitable characteristics of signals in controller area networks." IEEE Transactions on Vehicular Technology 67.6 (2018): 4757-4770. (Year: 2018).*

P.-S. Murvay and B. Groza, "TIDAL-CAN: Differential Timing Based Intrusion Detection and Localization for Controller Area Network," in IEEE Access, vol. 8, p. 68895-68912, 2020, doi: 10.1109/ACCESS.2020.2985326. (Year: 2020).*

* cited by examiner

METHOD FOR CHECKING A MESSAGE IN A COMMUNICATION SYSTEM

CROSS REFERENCE

The present application claims the benefit under 35 U.S.C. § 119 of German Patent Application No. DE 102020214945.3 filed on Nov. 27, 2020, which is expressly incorporated herein by reference in its entirety.

FIELD

The present invention relates to a method for checking a message in a communication system, as well as a processing unit and a computer program for carrying out same.

BACKGROUND INFORMATION

Increasing digitization results in ever-greater use of wireless interfaces in everyday products or systems such as vehicles. Despite numerous advantages, such interfaces also provide increasing options for intrusions. One particular problem is, for example, intrusions into electronic control units (ECUs), which in vehicles are responsible for various functions and the data exchange via vehicle-internal communication systems. An intruder may be enabled, for example, to influence safety-critical functions such as the steering, the brakes, or an engine control. Typical communication systems or communication media used in vehicles, for example, such as the CAN bus, via which such intrusions could be prevented, have been designed without safety measures per se.

Thus, an intruder, for example by connecting an additional device or by influencing existing control units on the communication medium, may impersonate another user and transfer unauthorized messages. Due to the mentioned lack of safety measures for the CAN protocol, for example, such identity theft may be successfully carried out, since the (other) users cannot check the authenticity of the transferred messages.

SUMMARY

According to the present invention, a method for checking a message in a communication system as well as a processing unit and a computer program for carrying out same are provided. Advantageous embodiments of the present invention are disclosed herein.

The present invention relates to the checking of a message in a communication system, in which multiple users are connected to a communication medium and exchange messages via same.

The problem of the lack of safety measures for communication media such as a CAN bus is generally known. To solve this problem, for example physical properties of the individual users (which are typically control units here) are utilized to identify the source of a transferred message. For example, for a clock-based intrusion detection system (so-called CIDS), the individual clock offsets of each user during the periodic message transfer are used to draw conclusions concerning the authenticity of the sender. These clock offsets may be used to recognize deviations from and anomalies of the previously observed transfer behavior, which in turn indicate an unauthorized origin of a message. However, as a result, aperiodic messages cannot be evaluated, and an intruder is also able to circumvent the system by observing the clock offset on the communication medium and subsequently adapting his/her transfers to the offset of the user to be imitated.

In addition, intrusion detection systems may be used which build on specific voltage properties of individual users during their transfer operations. A model of the voltage signature may be created from authorized messages and compared to the voltage signatures that are observed during the normal message exchange. Although good results for the detection accuracy may generally be achieved, voltage fluctuations due to temperature changes are problematic. In addition, high resource requirements are generally necessary for this purpose due to a comprehensive analysis of the voltage signal.

Existing approaches for providing authentication, which are based on physical properties such as internal clocks or voltages, either impose high demands on the computing resources, are not robust against signal fluctuations, or may be circumvented by a sophisticated intrusion.

In the procedure provided within the scope of an example embodiment of the present invention, a time difference between points in time of reception of a message that is sent on the communication medium is now ascertained at two different, predefined positions on the communication medium. Only the difference, not the absolute values, of the two propagation times of the message from the sending user up to the two positions is/are relevant, i.e., a propagation time difference. This may be determined via a detection means (detector(s)) which, with an appropriately designed connection, detects the message at the two positions. Based on a comparison of the time difference to at least one reference time difference, it is then determined whether the message originates from a verified user. Such reference time differences may be ascertained via test measurements, for example, in which it is ensured that an intruder does not alter or even send a message on the communication medium.

If the time difference deviates from a reference time difference by less than a predefined threshold value, for example, it may be determined or assumed that the message originates from a verified user. Otherwise, it may be determined or assumed that the message does not originate from a verified user, and in particular an intrusion attempt into the communication system is present. In general, a suitable model may also be used to carry out the comparison. Such a model describes, in particular for a plurality of users or the entire communication system, the associated differences in the propagation time differences, and may then be used to "verify" a propagation time difference that is subsequently measured for a certain user (or multiple or all users).

Thus, an implementation is provided which achieves the provision of the authentication based on signal or message propagation times, and which is also efficiently achievable in embedded systems. By using a so-called time-to-digital converter (TDC), which typically is particularly cost-effective, the time difference may be determined particularly easily and quickly, while the requirement for high-performance scanning hardware such as a fast analog-digital converter (ADCs) is dispensed with. In addition, the computing time for computing and assessing the time difference is relatively low, since simpler techniques may be used for the comparison.

In comparison to intrusion detection approaches, in which the clocking behavior or voltages is/are used, the provided procedure in accordance with an example embodiment of the present invention makes possible a greater degree of reliability and correctness. In this way, for example an intrusion detection system (or intrusion prevention system)

may be provided via which a standard of the so-called Automotive Safety Integrity Level (ASIL) may be met, since high identification rates and a very low false positive rate may be achieved. In this regard, even blocking of malicious messages on the communication medium or actively making them invalid may be considered in order to prevent successful intrusions.

Since it may be assumed that the signal propagation is hardly affected by external influences such as aging or material wear on a communication medium, sophisticated updating methods for identifying physical senders are not necessary. Even if influences on the signal propagation should occur, their effect on the propagation time would only be very slow and gradual. Abrupt changes are not to be expected. Rather, this results in the option for repeatedly adapting the reference time differences based on the measured time differences. It is thus possible, for example, to take small age-related changes in the propagation times into account.

In general, any system or communication system that implements a bus topology (for example, CAN, CAN FD, CAN XL, 10BASE-T1S, etc.) for the communication between multiple users and utilizes a broadcasting transmission may use the provided methodology. Based on the option for localizing the sending source of a message, the authentication may be provided where it is lacking, or existing safety implementations may be expanded for a more reliable safety concept. In this regard, it plays no role which communication protocol is implemented, as long as only one user is active on the bus in each case.

A processing unit according to the present invention, for example an ASIC or a microcontroller, for example a control unit of a motor vehicle, is configured to carry out a method according to the present invention, in particular by programming.

In addition, in accordance with an example embodiment of the present invention, implementing a method in the form of a computer program or computer program product including program code for carrying out all method steps is advantageous, since this involves particularly low costs, in particular when an operating control unit is also utilized for further tasks, and therefore is present anyway. Suitable data media for providing the computer program are in particular magnetic, optical, and electrical memories such as hard disks, flash memories, EEPROMs, DVDs, and others. In addition, downloading a program via computer networks (Internet, Intranet, etc.) is possible.

Further advantages and embodiments of the present invention result from the description here and the figures.

The present invention is schematically illustrated in the figures based on exemplary embodiments, and described below with reference to the figures.

DETAILED DESCRIPTION OF EXAMPLE EMBODIMENTS

Figure 1A:
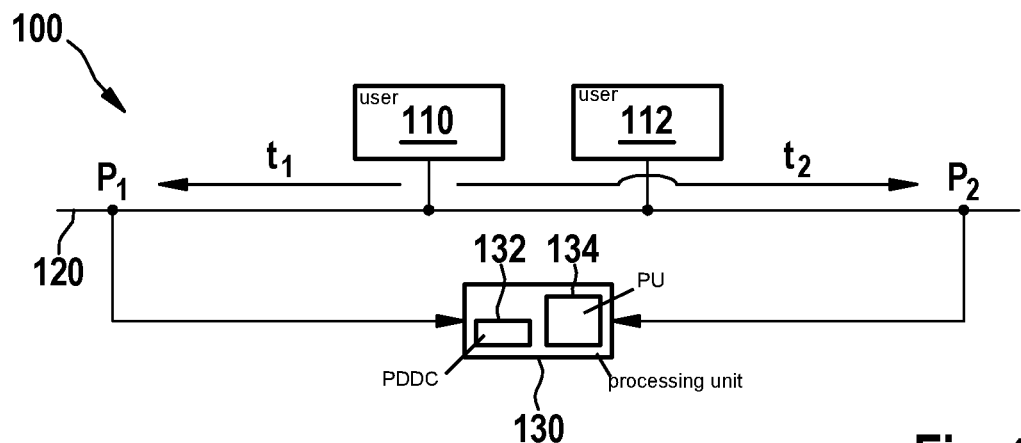
FIGS. 1A and 1B schematically shows a communication system in which a method according to the present invention may be carried out, in two variants.

FIG. 1 schematically illustrates a communication system in which a method according to the present invention may be carried out, in two variants. In FIG. 1A, a communication system 100 is shown with two users 110, 112 by way of example, which are connected or attached to a communication medium 120. Users 110, 112 may be, for example, control units in a vehicle, and communication medium 120 may be a CAN bus, for example.

In addition, a processing unit 130 is shown which is configured and used for ascertaining a time difference between points in time of reception of a message that is sent on the communication medium, at two different, predefined positions $P_1$ and $P_2$ on communication medium 120. The two points in time of reception are indicated by reference symbols $t_1$ and $t_2$, and in particular with user 110 as sender. For this purpose, processing unit 130 may be connected to communication medium 120 at positions $P_1$ and $P_2$. Processing unit 130 is explained in greater detail below.

Figure 1B:
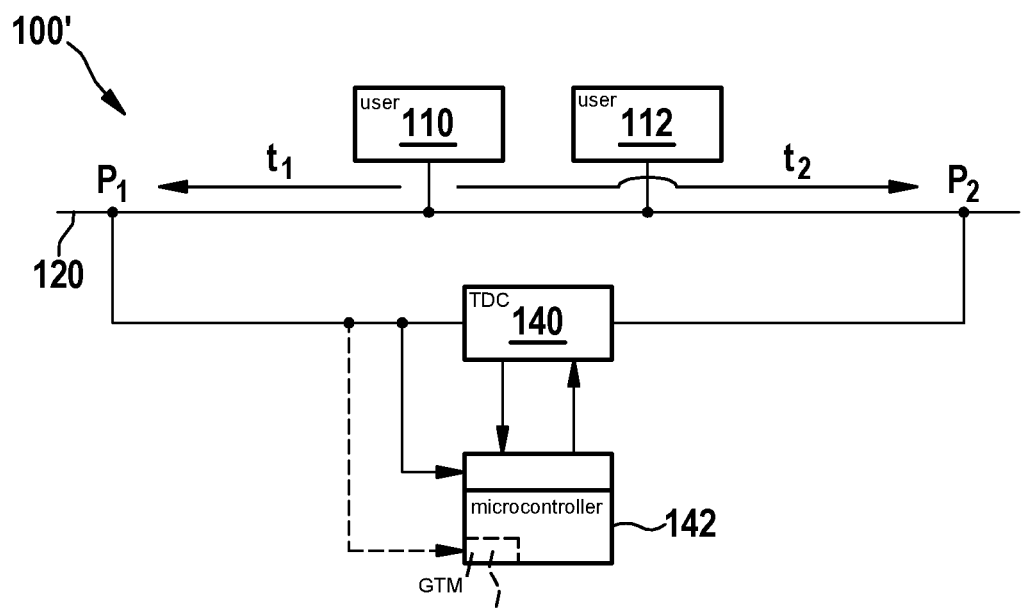

FIG. 1B shows a communication system 100' that does not differ per se from communication system 100 according to FIG. 1A; however, instead of processing unit 130 a time-to-digital converter (TDC) 140 and a microcontroller 142 are provided, which are likewise configured and used for ascertaining a time difference between points in time of reception of a message that is sent on the communication medium, at two positions $P_1$ and $P_2$ on communication medium 120. The processing unit thus formed is likewise explained in greater detail below.

Figure 3:
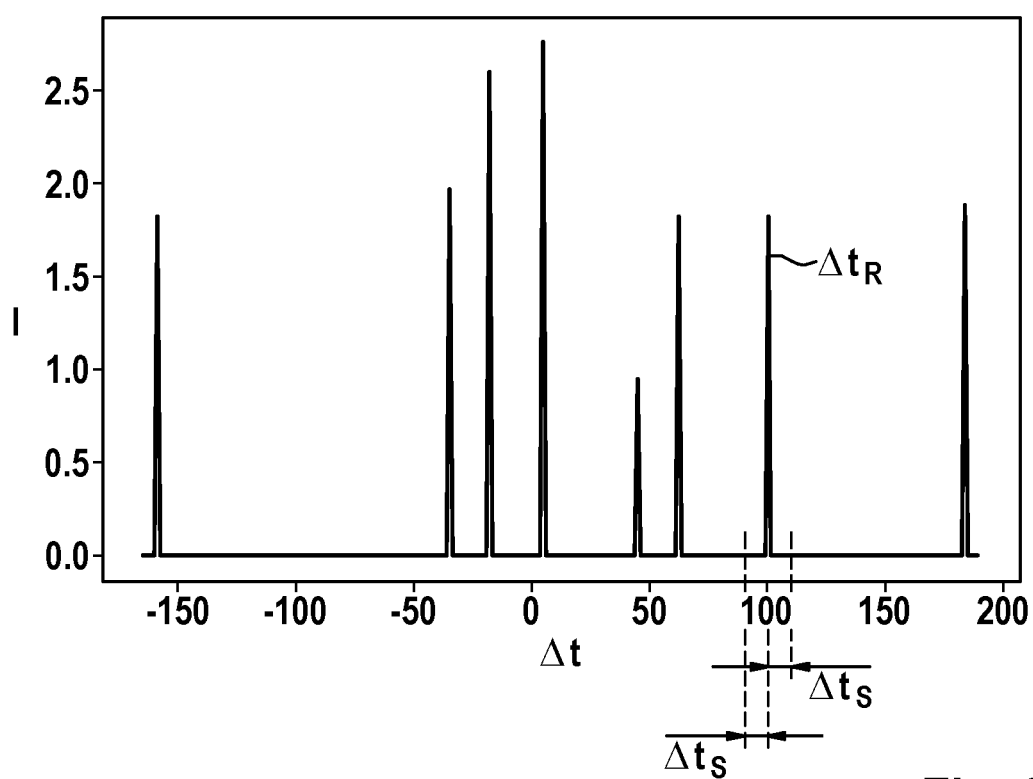
FIG. 3 shows a diagram including reference time differences as may be used in a method according to the present invention.

The general procedure of the provided method, which ultimately represents or makes possible an intrusion detection system or an intrusion prevention system, is explained first. The actual time differences are to be measured, using valid messages from each user, when it is certain that no intruder is present. In particular, each user of the communication system is thus measured. Reference time differences are thus obtained, which are also shown in FIG. 3. For this purpose, for example cryptographically secured messages, or messages that are sent in a secured environment such as a repair shop or a manufacturing plant, may be used. For example, a model for subsequent comparisons is created in this learning phase, based on the ascertained time differences. A simpler model may encompass a lookup table, a probability distribution, or a decision tree, for example.

After this phase, the entire communication system may be put into operation, the time difference of the message transferred at that moment being determined and assessed using the previously established model. In principle, it is also possible to determine a plurality of time differences for messages from different users and to compare them to the model of all users. In addition, sender information (in the case of CAN, this is the message identification or ID, for example) is extracted, on the basis of which the authenticity is checked. According to the implemented communication protocol (i.e., the CAN protocol, for example), an appropriate countermeasure may be initiated, if desired, in order to invalidate the transfer in progress (for CAN, this may involve, for example, sending an error message or blocking the bus) if the sender (i.e., the present checked user) is classified as unauthorized. Alternatively or additionally, it may be provided to carry out a notification to an appropriate location (for example, a user of the control unit) or logging (recording) of the result.

For implementing the functions mentioned above, in particular two components are necessary, which may be provided, for example, in a shared processing unit such as processing unit 130, which may be an application-specific integrated circuit (ASIC), for example. The first component, for example component 132 according to FIG. 1A, then determines the time difference on the communication medium.

This component is also referred to below as a propagation difference determination component (PDDC). The PDDC could be developed or provided, for example, as part of the ASIC, or as some other independent circuit that measures the time difference between two signals at the two positions, for example also the ends, of the communication medium based on an internal timer, for example.

In addition, a processing unit, also referred to below as reference symbol PU, as denoted in FIG. 1A by reference numeral 134, is necessary for processing the detected time difference. This processing unit may likewise be part of the ASIC.

As a function of the tasks that are to be taken over, for example a simpler or also more powerful microcontroller 142 (cf. FIG. 1B) or a specific processor core may instead be used. In particular, a TDC 140 may then be used for determining the time difference. Based on the desired implementation, the provided system may be built, for example, from standard components such as a TDC and a microcontroller. However, in principle it is also possible to integrate a TDC into an ASIC.

Figure 2:
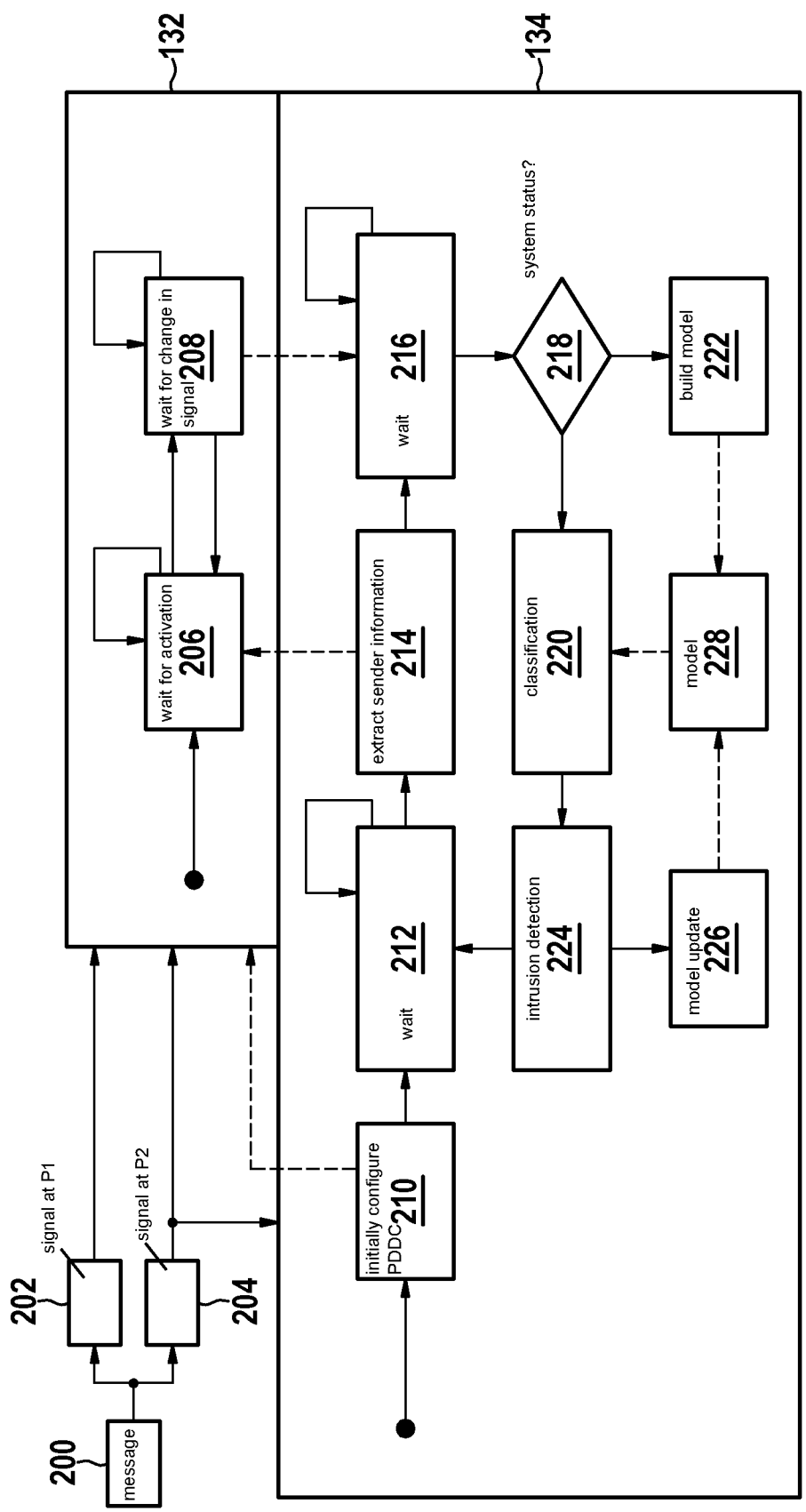
FIG. 2 schematically shows a sequence of a method according to the present invention in one preferred specific embodiment.

FIG. 2 schematically illustrates the sequence of a method according to the present invention in one preferred specific embodiment, in particular with regard to components PDDC 132 and PU 134 (cf. FIG. 1A), in which portions of the method are carried out in each case.

PDDC 132, for example, must initially be configured by PU 134 upon system startup as a function of the desired and available operating mode according to step 210. The configuration may take place via communication channels such as SPI or I²C, using standard hardware, or by static loading of registers with standard values if an ASIC is used. Possible properties that could be taken into account for the configuration include, among others, the number of measurements to be carried out and the question of whether triggering is to take place for a falling or rising signal edge. After completion of the configuration, PU 134 actively waits, according to step 212, for a message transfer on the communication medium or is triggered by same.

Upon recognition of a transferred message 200, necessary sender information is extracted by PU 134 according to step 214. This information may represent the message identification in the case of CAN, or a MAC address in the case of Ethernet. By providing a link from the communication medium to PU 134, this information may generally be obtained in two ways. Either PU 134 determines this actively by using a general purpose input/output (GPIO) port and an appropriate timer in order to detect the individual bits on the communication medium, or a general timer IP module (GTM, cf. also component 144 in FIG. 1B) may be used which records the bits independently of PU 134 via a GPIO port and provides the result after completion of the scanning. GTMs are already used in the automotive field, and are present in automotive microcontroller architectures.

At this point, it should be noted that the sender information may also be extracted using dedicated circuits, based on the communication protocol used. For CAN, the message identification may be detected via the CAN controller, for example, which, however, increases the coordination effort for the overall procedure. The association between the transferred message and the sending unit is established based on the sender information.

If it is established that a message is sent, PU 134 activates PDDC 132 (which according to step 206 waits for the activation) in the next step, and waits for receipt of the result according to step 216. PDDC 132 then leaves the rest state, and according to step 208 waits for a change in a signal that is based on signal 202 from the measuring point at position $P_1$ and signal 204 from the measuring point at position $P_2$. Only one sender (or user) is to occupy the communication medium when PDDC 132 is activated. Otherwise, the obtained result would possibly not correspond to the actual time difference.

The recorded points in time of reception or propagation times are subsequently transferred from PDDC 132 to PU 134, after which PDDC 132 once again changes to the rest state and waits for the next activation.

As soon as the time difference is determined, the next steps in the procedure depend on system status 218. A learning phase is carried out if basic changes have been made to the communication medium or if the system has been switched on for the first time. It is also advantageous to carry out such a learning phase upon each start-up. According to step 222 and the time difference and optionally the sender information, a model 228 is built which includes the above-mentioned reference time differences. The model is subsequently used for classification 220 and intrusion detection 224, i.e., the recognition of an intruder.

It is important to be able to ensure the absence of an intruder during this phase, since otherwise the model could be damaged or incorrectly set up. To keep the operation of the system as simple as possible, various models, including lookup tables, decision trees, or probability distributions, may be considered in order to compare the time difference to reference time differences.

FIG. 3 illustrates a diagram by way of example, including reference time differences as may be used in a method according to the present invention, namely, as a probability distribution model of eight senders or users on the communication medium, using a Gaussian distribution. For this purpose, a probability density is plotted as a function of a time difference Δt (in ns by way of example).

Regardless of which model is selected, the time difference is used in classification step 220 to determine the actual sender. Based on the extracted sender information in the initial steps, i.e., reference time differences $\Delta t_R$, for example, as well as the sender information and actual time difference Δt actually determined in classification step 220, a statement is made concerning the authenticity of transferred message 200, and a possible intrusion is recognized and possibly characterized. As an example, FIG. 2 shows threshold values $\Delta t_s$ that may be used to assess whether or not for an ascertained actual time difference Δt, a verified user may still be deduced (for example, when the time difference differs from the reference time difference by less than the threshold value). In the latter case, appropriate measures may be taken, including recording the intrusion, warning the driver of the vehicle, or carrying out countermeasures, for example.

If the transfer is legitimate, the computed time difference may be taken into account for a model update 226 in order to manage possible incremental changes in the propagation differences due to external influences such as temperature or aging. After this step, the system returns to the "wait for transfer" state according to step 212, and initiates this process anew when the next message is transferred via the communication medium.

What is claimed is:

1. A method for checking a message in a communication system, in which multiple users are connected to a communication medium and exchange messages via the communication medium, the method comprising the following steps:

ascertaining a time difference between (a) a first point in time at which a message that is sent by a first one of the multiple users on the communication medium is received at a first predefined position on the communication medium and (b) a second point in time at which the message is received at a second predefined position on the communication medium;

determining an offset between the ascertained time difference and a first one of a plurality of reference time differences of a stored model that are associated in the model with respective ones of the multiple users, each of the plurality of reference time differences being a respective expected difference between a time at which a message from the respective one of the multiple users with which the respective reference time difference is associated is expected to be received at the first predefined position and a time at which the message from the respective one of the multiple users with which the respective reference time difference is associated is expected to be received at the second predefined position, the first one of the plurality of reference time differences being associated with the first one of the multiple users;

comparing the offset to a predefined threshold offset; and
conditional upon that the offset does not exceed the predefined threshold offset:
  authenticating the user as a verified user; and
  at least when the offset is a non-zero offset, updating the model by replacing the first one of the reference time differences in the model with the ascertained time difference.

2. The method as recited in claim 1, wherein the time difference is ascertained using a time-to-digital converter (TDC) and/or a microcontroller.

3. The method as recited in claim 1, wherein the time difference is ascertained using an application-specific integrated circuit (ASIC).

4. The method as recited in claim 1, further comprising invalidating a subsequent message in response to the offset determined for the subsequent message exceeding the predefined threshold offset.

5. The method as recited in claim 4, wherein a determination is made for the subsequent message that an intrusion attempt into the communication system is present based on the exceedance of the predefined threshold offset.

6. The method as recited in claim 1, wherein the time difference is detected when only a single user sends a message on the communication medium.

7. The method as recited in claim 1, wherein the communication medium utilizes a broadcasting transmission, and is configure as a CAN bus, or CAN FD bus, or AN XL bus, or 10BASE-T1S bus.

8. A processing unit configured to check a message in a communication system, in which multiple users are connected to a communication medium and exchange messages via the communication medium, the processing unit comprising a processor configured to:

ascertain a time difference between (a) a first point in time at which a message that is sent by a first one of the multiple users on the communication medium is received at a first predefined position on the communication medium and (b) a second point in time at which the message is received at a second predefined position on the communication medium;

determine an offset between the ascertained time difference and a first one of a plurality of reference time differences of a stored model that are associated in the model with respective ones of the multiple users, each of the plurality of reference time differences being a respective expected difference between a time at which a message from the respective one of the multiple users with which the respective reference time difference is associated is expected to be received at the first predefined position and a time at which the message from the respective one of the multiple users with which the respective reference time difference is associated is expected to be received at the second predefined position, the first one of the plurality of reference time differences being associated with the first one of the multiple users;

compare the offset to a predefined threshold offset; and
conditional upon that the offset does not exceed the predefined threshold offset:
  authenticate the user as a verified user; and
  at least when the offset is a non-zero offset, update the reference time difference to be the ascertained time difference.

9. A non-transitory machine-readable memory medium on which is stored a computer program for checking a message in a communication system, in which multiple users are connected to a communication medium and exchange messages via the communication medium, the computer program, when executed by a computer, causing the computer to perform the following steps:

ascertaining a time difference between (a) a first point in time at which a message that is sent by a first one of the multiple users on the communication medium is received at a first predefined position on the communication medium and (b) a second point in time at which the message is received at a second predefined position on the communication medium;

determining an offset between the ascertained time difference and a first one of a plurality of reference time differences of a stored model that are associated in the model with respective ones of the multiple users, each of the plurality of reference time differences being a respective expected difference between a time at which a message from the respective one of the multiple users with which the respective reference time difference is associated is expected to be received at the first predefined position and a time at which the message from the respective one of the multiple users with which the respective reference time difference is associated is expected to be received at the second predefined position, the first one of the plurality of reference time differences being associated with the first one of the multiple users;

comparing the offset to a predefined threshold offset; and
conditional upon that the offset does not exceed the predefined threshold offset:
  authenticating the user as a verified user; and
  at least when the offset is a non-zero offset, updating the reference time difference to be the ascertained time difference.

* * * * *